July 23, 1968   J. C. TAYLOR, JR., ET AL   3,393,857
SOLDERING IRON HAVING CAM-ACTUATED CHUCK AND REPLACEABLE TIP
Filed May 24, 1965
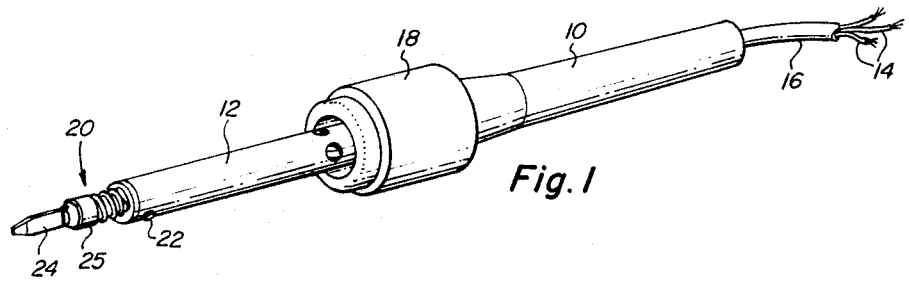
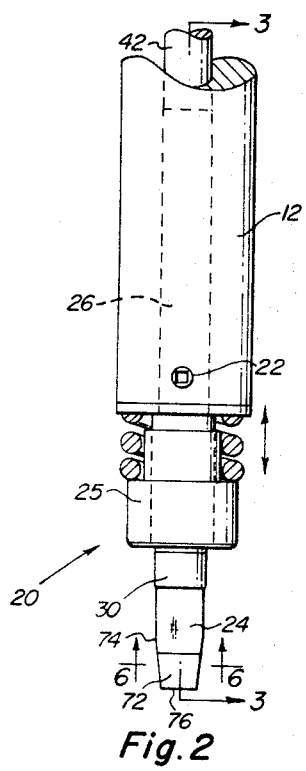
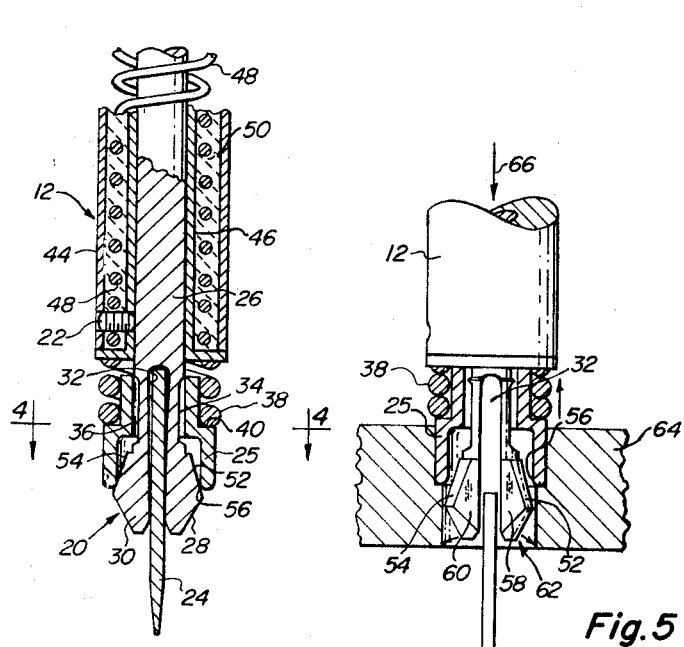
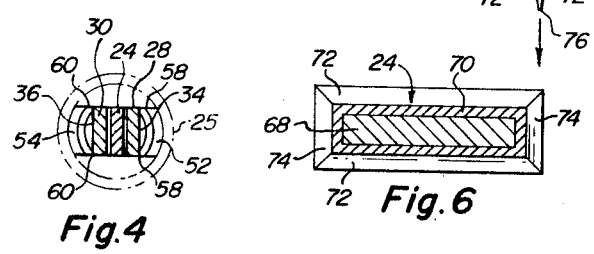
JOHN C. TAYLOR JR.
DONALD W. VERLEY
INVENTORS
BY
BUCKHORN, BLORE, KLARQUIST & SPARKMAN
ATTORNEYS

United States Patent Office 3,393,857
Patented July 23, 1968

3,393,857
SOLDERING IRON HAVING CAM-ACTUATED
CHUCK AND REPLACEABLE TIP
John C. Taylor, Jr., Portland, and Donald W. Verley,
Newberg, Oreg., assignors to Tektronix, Inc., Beaverton, Oreg., a corporation of Oregon
Filed May 24, 1965, Ser. No. 458,312
8 Claims. (Cl. 228—55)

ABSTRACT OF THE DISCLOSURE

A soldering iron is described having a cam actuated chuck for releasably holding a soldering tip member. A cam sleeve surrounds the chuck jaws and is spring biased outward to compress such jaws on the tip member. The soldering tip is a thin, flat member of rectangular cross-section having a coating of non-oxidizing metal thereon.

The subject matter of the present invention relates generally to electrical soldering irons and to replaceable soldering tips employed within such irons, and in particular to a soldering iron having a spring-loaded cam sleeve actuating a chuck which holds a thin flat tip member between the jaws of such chuck, such tip having a rectangular cross-section and a coating of non-oxidizing metal.

The soldering iron of the present invention is especially useful for continuously soldering electrical connections during the manufacture of electrical instruments such as cathode ray oscilloscopes, since it enables the soldering tip to be replaced quickly and easily without damaging the iron. Similarly, the soldering iron tip of the present invention is especially useful for making soldering connections on the production line because it is of a simple, low-cost construction which requires no filing to remove oxidation, thereby saving much production time.

The present soldering iron has several advantages over previous soldering irons due to its spring-loaded chuck which is simple and inexpensive in construction and enables the soldering tip to be removed from the iron quickly and easily without the use of special tools. The chuck jaws of the soldering iron engage the tip tightly to provide better heat conduction to the tip, but prevent such tip from "freezing" within the soldering iron which might otherwise cause damage to the soldering iron during removal of the tip, or necessitate throwing the iron away with the tip after the tip is worn out. The soldering tip of the present invention provides better heat conduction to the pointed front end portion of such tip, due to its thin, flat shape. In addition, the present soldering tip is provided with a coating of metal alloy to prevent oxidation so that it remains clean after repeated use and no filing of the tip is necessary to maintain good heat conduction. The nonoxidizing coating also provides a better "wetting" action on the pieces being soldered and prevents the tip from sticking in the jaws of the soldering iron chuck. Also the present soldering tip is of a simple, low-cost construction so it can be thrown away and replaced by a new tip at a lower cost than that of the time required to file conventional tips to remove oxidation therefrom.

It is therefore one object of the present invention to provide an improved electrical soldering iron of simple and inexpensive construction which enables the soldering tip of such iron to be replaced in a quick and easy manner without the use of special tools.

Another object of the invention is to provide an improved soldering iron having a spring-loaded chuck which holds the soldering tip of such iron tightly within the chuck for good heat conduction to the tip and which enables easy replacement of such tip.

A further object of the present invention is to provide an improved soldering tip of simple, low-cost construction which is of a shape that enables better heat conduction to the pointed end portion of such tip.

An additional object of the invention is to provide a soldering iron tip having a coating of non-oxidizing material to provide better heat conduction, superior wetting characteristics and to prevent the tip from sticking in the soldering iron.

Other objects and advantages of the present invention will be apparent from the following detailed description of a preferred embodiment thereof and from the attached drawings of which:

FIG. 1 is an oblique view of the soldering iron and tip of the present invention;

FIG. 2 is an enlarged view of a portion of the soldering iron and tip of FIG. 1;

FIG. 3 is a vertical section view taken along the line 3—3 of FIG. 2;

FIG. 4 is a horizontal section view taken along the line 4—4 of FIG. 3 with parts broken away for clarity;

FIG. 5 is an enlarged view of a portion of the soldering iron of FIG. 1 showing the soldering tip being removed from the chuck jaws of such iron; and FIG. 6 is a horizontal sectional view of the soldering tip taken along the line 6—6 of FIG. 2.

As shown in FIGS. 1 and 2, one embodiment of the soldering iron of the present invention includes a handle portion 10 of plastic material which is secured to a heating member 12 in a conventional manner, so that electrical wires 14, contained within a power cord 16 attached to the rear end of the handle, extend through such handle into such heating member. A sleeve 18 of cork or other suitable heat insulating material is secured to the outer surface of the handle 10 adjacent the heating element 14 to enable the operator to grip the handle without discomfort during soldering. A spring-loaded chuck device 20, which serves as a soldering tip holder means, is secured within the front end of the heating member 12 by a set screw 22 extending through the side of such heating member. The set screw may be made of stainless steel to prevent such set screw from sticking due to heat expansion and oxidation. A soldering tip 24 is held by the chuck device 20 in the normal position of a cam sleeve 25 in such device.

As shown in FIG. 3 the spring-loaded chuck device 20 includes a chuck member 26 having an annular shaft extending into the heating member 12, and a pair of spaced, spring-like jaw portions 28 and 30 which are separated by a rectangular slot 32 of slightly greater width than the width of the soldering tip 24 in the relaxed position of such jaw portions to enable the insertion of such tip into such slot. The outer surface of each of the jaw portions 28 and 30 of the chuck is provided with a flat depression 34 and 36, respectively, to enable resilient flexing of such jaw portions in a direction substantially perpendicular to the center plane of the slot. As a result, when the cam sleeve 25 is moved forward into engagement with the jaw portions 28 and 30 by a coil spring 38 surrounding the chuck member, such jaw portions are pushed together to clamp the soldering tip 24 between them in the position shown in FIG. 3. The chuck member 26 is inserted into a passageway extending axially through the tubular heating member 12 until the rear end of such chuck member engages a stop 42 positioned within the passageway or until the spring 38 reaches the desired compression, and is held in that position by the set screw 22 extending through the side of the heating member. The coil spring 38 is positioned about the rear end of the cam sleeve 25 with one end in contact with an external shoulder 40 on such cam sleeve and its other end in contact with the front end of the heating member 12 so that such spring is compressed and urges the cam sleeve forward along the chuck jaws.

The heating member 12 may include an outer metal tube 44 and an inner metal tube 46 contained within such outer tube. A coiled heater wire 48 is supported about the inner tube 46 in the space between the inner and outer tubes and insulated therefrom by a filling of refractory electrical insulating material 50, which may be in the form of mica beads (not shown). The opposite ends of the heater wire 48 are connected to two of the wires 14 in the power cord 16, while the inner and outer tubes 44 and 46 are connected to ground potential through the third wire, as are the chuck 26 and tip 24. Of course any other suitable electrical resistance heater can be employed in place of that shown.

The jaw portions 28 and 30 of the chuck are each provided with a conical cam surface 52 and 54, respectively, which slopes forwardly and outwardly and is engaged by the rounded inner surface 56 of the front end of the tubular cam sleeve 25. In addition, the jaw portions 28 and 30 are each provided with a pair of flat surfaces 58 and 60, respectively, on the opposite sides of such jaw portions. As a result of this configuration the jaw portions have a force exerted on them in a direction substantially perpendicular to the center plane of the slot between such jaw portions, by the cam sleeve 25 to cause such jaw portions to bend inwardly into engagement with the soldering tip.

As shown in FIG. 5, in order to remove or insert a soldering tip 24 out of or into the chuck jaws, the chuck is inserted into an annular hole 62 extending through a fixed metal plate 64 secured to the work bench. The hole 62 is of the proper diameter so that the cam sleeve 25 is engaged by an internal shoulder on the apertured plate 64 to cause the spring 38 to be compressed when the soldering iron is pushed forward in the direction of arrow 66. This causes the chuck jaws 28 and 30 to be pushed out of engagement with the inner surface of the cam sleeve to enable such chuck jaws to spring outwardly to the position shown in FIG. 5. When this happens the old soldering tip 24 can easily be removed from such jaws, and a new one inserted in its place.

The soldering tip 24 of the present invention is a thin, flat metal body 68 of high heat-conducting material, such as electrolytic copper, which is coated with a thin layer 70 of non-oxidizing metal alloy. Such alloy may have a composition by weight of approximately 50 to 75% copper, 15 to 30% tin and 5 to 20% zinc such as the type sold under the trademark "Albaloy." The shank portion of the soldering tip which extends between the chuck jaws may typically have a width of about .21-inch and a thickness of .064-inch, while the length of the entire tip may be about 1 3/16-inch. With a tip of these dimensions, the slot 32 in the chuck member is provided with a length of 1 9/32-inch and a width of .066 inch. The soldering tip member is provided with a pointed front end portion having a pair of flat inwardly tapering side surfaces 72 of about 1/8-inch in length and a pair of flat inwardly tapering edge surfaces 74 of about 1/4-inch in length. The side surfaces 72 and the edge surfaces 74 terminate in a substantially flat, rectangular end surface 76 approximately 1/8-inch long and 1/32-inch wide, so that the front end portion of the tip is in the shape of the frustum of a four-sided pyramid. It has been found that this frusto-pyramidal shape together with the alloy coating 70 provides a hot soldering tip having a good wetting action on the parts being soldered.

While the alloy coating 70 can be provided merely on the pointed front end portion of the welding tip, it can also be extended over the entire tip member including its shank portion in order to prevent such shank portion from sticking within the jaws of the chuck. The chuck member 26 can be made of metal alloy having a percentage by weight of 90.75% copper, 7.25% aluminum and 2.00% silicon in order to provide chuck jaws of sufficient hardness and resiliency together with a non-oxidizing surface to enable maximum heat transfer between the chuck and the tip. The cam sleeve 25 may be made of the same material as the chuck member for similar reasons and to provide these members with the same thermal coefficient of expansion.

It will be obvious to those having ordinary skill in the art that many changes may be made in the details of the above-described preferred embodiment of the present invention without departing from the spirit of the invention. For example, a circular cylindrical soldering tip can be employed in place of the flat tip 24 and the shape of the slot 32 changed accordingly to a circular cross-section. Therefore the scope of the present invention should only be determined by the following claims.

We claim:

1. A soldering iron comprising:
an electrical heating element;
holder means having a plurality of spaced jaw portions, for releasably holding a soldering tip between said jaw portions;
cam means movably mounted for sliding engagement with said jaw portions to cause said jaw portions to move toward said soldering tip;
spring means for urging said cam means in one direction to cause said jaw portions to contract on the soldering tip, and for enabling said cam means to be moved in another direction to release said soldering tip; and
support means for supporting said jaw portions and said heating element in heat conducting relationship.

2. A soldering iron comprising:
an electrical heating element;
a removable soldering tip;
holder means having a plurality of spaced resilient jaw portions for holding said soldering tip between said jaw portions;
cam means movably mounted for sliding engagement with said jaw portions to cause said jaw portions to move toward said soldering tip;
spring means for urging said cam means in one direction to cause said jaw portions to contract on the soldering tip, and for enabling said cam means to be moved in another direction to release said soldering tip; and
support means for supporting said jaw portions and said heating element in heat conduiting relationship.

3. A soldering iron comprising:
an electrical heating element;
a removable soldering tip;
holder means having a movable spring biased cam member and a plurality of spaced resilient jaw portions mounted in sliding engagement with said cam member, for holding said soldering tip between said jaw portions in one position of said cam member and for releasing said soldering tip from said jaw portions by longitudinal movement of said cam member into another position; and
support means for supporting said jaw portions and said heating element in heat conducting relationship.

4. A soldering iron comprising:
an electrical heating element;
a removable soldering tip;
holder means having a spring biased cam sleeve and a plurality of spaced resilient jaw portions mounted in sliding engagement with said cam member, for holding said soldering tip between said jaw portions in an extended position of said cam sleeve and for releasing said soldering tip from said jaw portions in a retracted position of said cam sleeve; and
support means for supporting said jaw portions and said heating element in heat conducting relationship.

5. A soldering iron comprising:
an electrical heating element;

a chuck member including a plurality of spaced resilient jaw portions at the front end of said chuck member for holding a removable soldering tip between said jaw portions, said jaw portions having exterior cam surfaces;

cam sleeve positioned about said chuck member so that said cam sleeve engages the cam surfaces on the jaw portions to urge said jaw portions together into engagement with the soldering tip when said cam sleeve is moved into a first longitudinal position, and disengages from said cam surfaces to release the soldering tip from the jaw portions when the cam sleeve is moved into a second longitudinal position;

support means for supporting said chuck member and said heating element in heat conducting relationship; and spring means for resiliently urging said cam sleeve into said first position.

6. A soldering iron comprising:

an electrical heating element;

a removable soldering tip;

a chuck member including a plurality of spaced resilient jaw portions at the front end of said chuck member for holding said soldering tip between said jaw portions, said jaw portions having exterior cam surfaces;

a cam sleeve positioned about said chuck member so that the inner surface of said cam sleeve engages the cam surfaces on the jaw portions to urge said jaw portions together into engagement with the soldering tip when said cam sleeve is moved into a first longitudinal position toward the front end of said tip, and disengages from said cam surfaces to release the soldering tip from the jaw portions when the cam sleeve is moved into a second longitudinal position away from said tip;

support means for supporting said chuck member and said heating element in heat conducting relationship; and spring means to resiliently urge said cam sleeve into said first position.

7. A soldering iron comprising:

an electrical heating element;

a removable soldering tip in the form of a flat plate of rectangular cross section;

a chuck member including a pair of spaced resilient jaw portions at the front end of said chuck member for holding said soldering tip in a slot between said jaw portions, said jaw portions having exterior cam surfaces extending forwardly and outwardly on the adjacent front ends of said jaw portions;

a cam sleeve positioned about said chuck member so that the inner surface of said cam sleeve engages the cam surfaces on the jaw portions to urge said jaw portions together into engagement with the sides of the soldering tip when said cam sleeve is moved into a forward position, and disengages from said cam surfaces to release the soldering tip from the jaw portions when the cam sleeve is moved rearwardly from said forward position;

support means for supporting said chuck member and said heating element in heat conducting relationship; and a coil spring positioned about said chuck member and compressed between said support means and said cam sleeve to resiliently urge said cam sleeve into said forward position.

8. A soldering iron comprising:

an electrical resistance heating element;

a removable soldering tip in the form of a flat plate of rectangular cross section and having a tapered point at the front end of said tip;

a chuck member including a pair of spaced resilient jaw portions at the front end of said chuck member for holding said soldering tip in a slot between said jaw portions, said jaw portions having exterior cam surfaces extending forwardly and outwardly on the adjacent front ends of said jaw portions;

a cam sleeve positioned about said chuck member so that the inner surface of said cam sleeve engages the cam surfaces on the jaw portions to urge said jaw portions together into engagement with the soldering tip when said cam sleeve is moved into a forward position, and disengages from said cam surfaces to release the soldering tip from the jaw portions when the cam sleeve is moved rearwardly from said forward position;

support means for supporting said chuck member and said heating element in heat conducting relationship; and a coil spring positioned about said chuck member and compressed between said support means and said cam sleeve to resiliently urge said cam sleeve into said forward position.

References Cited

UNITED STATES PATENTS

| | | | |
|---|---|---|---|
| 1,372,778 | 3/1921 | Sands | 228—55 |
| 2,478,382 | 8/1949 | Fischer | 279—1 |

FOREIGN PATENTS 437,830  11/1935  Great Britain.

RICHARD H. EANES, Jr., *Primary Examiner.*